US008352787B2

(12) United States Patent
Hoshino et al.

(10) Patent No.: US 8,352,787 B2
(45) Date of Patent: Jan. 8, 2013

(54) PLANT CONTROL SYSTEM AND METHOD

(75) Inventors: Takeo Hoshino, Tokyo (JP); Kenji Sorao, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 257 days.

(21) Appl. No.: 12/677,176

(22) PCT Filed: Oct. 3, 2008

(86) PCT No.: PCT/JP2008/068063
§ 371 (c)(1),
(2), (4) Date: Mar. 9, 2010

(87) PCT Pub. No.: WO2009/044864
PCT Pub. Date: Apr. 9, 2009

(65) Prior Publication Data
US 2010/0318199 A1 Dec. 16, 2010

(30) Foreign Application Priority Data
Oct. 5, 2007 (JP) ................................ 2007-262632

(51) Int. Cl.
*G06F 11/00* (2006.01)
(52) U.S. Cl. ............................. 714/25; 700/79; 700/21
(58) Field of Classification Search ..................... 714/25
See application file for complete search history.

(56) References Cited

U.S. PATENT DOCUMENTS

| 5,185,708 | A | * | 2/1993 | Hall et al. | 700/7 |
| 5,453,926 | A | * | 9/1995 | Stroschin et al. | 700/83 |
| 5,919,250 | A | * | 7/1999 | Shimokawa | 709/252 |
| 6,026,336 | A | * | 2/2000 | Sakurai et al. | 700/86 |
| 6,032,203 | A | * | 2/2000 | Heidhues | 710/11 |
| 6,334,076 | B1 | * | 12/2001 | Sakurai et al. | 700/86 |
| 6,411,858 | B1 | * | 6/2002 | Sakurai et al. | 700/18 |

(Continued)

FOREIGN PATENT DOCUMENTS
JP    61-131134 A    6/1986
(Continued)

OTHER PUBLICATIONS

Korean Office Action dated Oct. 13, 2011, issued in corresponding Korean Patent Application No. 10-2010-7009851.

(Continued)

*Primary Examiner* — Kamini Patel
(74) *Attorney, Agent, or Firm* — Birch, Stewart, Kolasch & Birch, LLP

(57) ABSTRACT

A plant control system includes a process computer (1) managing a plant, a PLC (2) interposed between the process computer (1) and equipment (3) of the plant, and a general-purpose PC (7) executing arithmetic processing based on arithmetic data received from the PLC (2) and transmitting arithmetic result data thereof to the PLC (2). The functions are divided such that sequential control logic is executed by the PLC (2) and complicated arithmetic processing is executed by the general-purpose PC (7), and the arithmetic result data outputted from the general-purpose PC (7) always passes through the PLC (2) so that consistency of the arithmetic result data is checked in the PLC (2). This makes it possible to apply a general-purpose personal computer (general-purpose PC) to the plant control system so as to divide the functions between the programmable logic controller (PLC) and the general-purpose PC and to compensate the reliability of the general-purpose PC in an industrial application, for example, in terms of punctuality.

5 Claims, 7 Drawing Sheets

U.S. PATENT DOCUMENTS

| | | | |
|---|---|---|---|
| 6,411,863 B1* | 6/2002 | Dickman | 700/206 |
| 7,142,943 B2* | 11/2006 | Groll et al. | 700/169 |
| 7,206,646 B2* | 4/2007 | Nixon et al. | 700/83 |
| 7,598,844 B2* | 10/2009 | Corcoran et al. | 340/12.32 |
| 7,966,151 B2* | 6/2011 | Filev et al. | 702/182 |
| 2003/0144746 A1* | 7/2003 | Hsiung et al. | 700/28 |
| 2004/0128027 A1* | 7/2004 | Groll et al. | 700/245 |
| 2004/0233927 A1* | 11/2004 | Hirosawa | 370/445 |
| 2005/0004781 A1* | 1/2005 | Price et al. | 702/188 |
| 2005/0246039 A1* | 11/2005 | Iino et al. | 700/29 |
| 2006/0069459 A1* | 3/2006 | Retlich | 700/108 |
| 2006/0070010 A1* | 3/2006 | Retlich | 715/798 |
| 2007/0006149 A1* | 1/2007 | Resnick et al. | 717/116 |
| 2007/0300292 A1* | 12/2007 | Scipioni et al. | 726/5 |
| 2008/0125885 A1* | 5/2008 | McNutt et al. | 700/81 |
| 2008/0126882 A1* | 5/2008 | Fulton et al. | 714/48 |
| 2008/0133789 A1* | 6/2008 | McNutt et al. | 710/30 |
| 2008/0312757 A9* | 12/2008 | Nixon et al. | 700/83 |
| 2009/0028184 A1* | 1/2009 | Carpman et al. | 370/466 |
| 2009/0043415 A1* | 2/2009 | Sun et al. | 700/117 |
| 2009/0083589 A1* | 3/2009 | Fulton et al. | 714/48 |
| 2010/0076724 A1* | 3/2010 | Brown et al. | 702/179 |
| 2010/0172369 A1* | 7/2010 | Ohmi | 370/445 |
| 2010/0205156 A1* | 8/2010 | Anderson et al. | 707/690 |
| 2011/0025249 A1* | 2/2011 | El-Ibiary | 318/567 |
| 2011/0137432 A1* | 6/2011 | Wang et al. | 700/79 |

FOREIGN PATENT DOCUMENTS

| | | |
|---|---|---|
| JP | 9-179608 A | 7/1997 |
| JP | 2000-137662 A | 5/2000 |
| JP | 2007-43256 A | 2/2007 |
| KP | 10-0191024 B1 | 1/1999 |

OTHER PUBLICATIONS

International Search Report.

* cited by examiner

F I G. 1
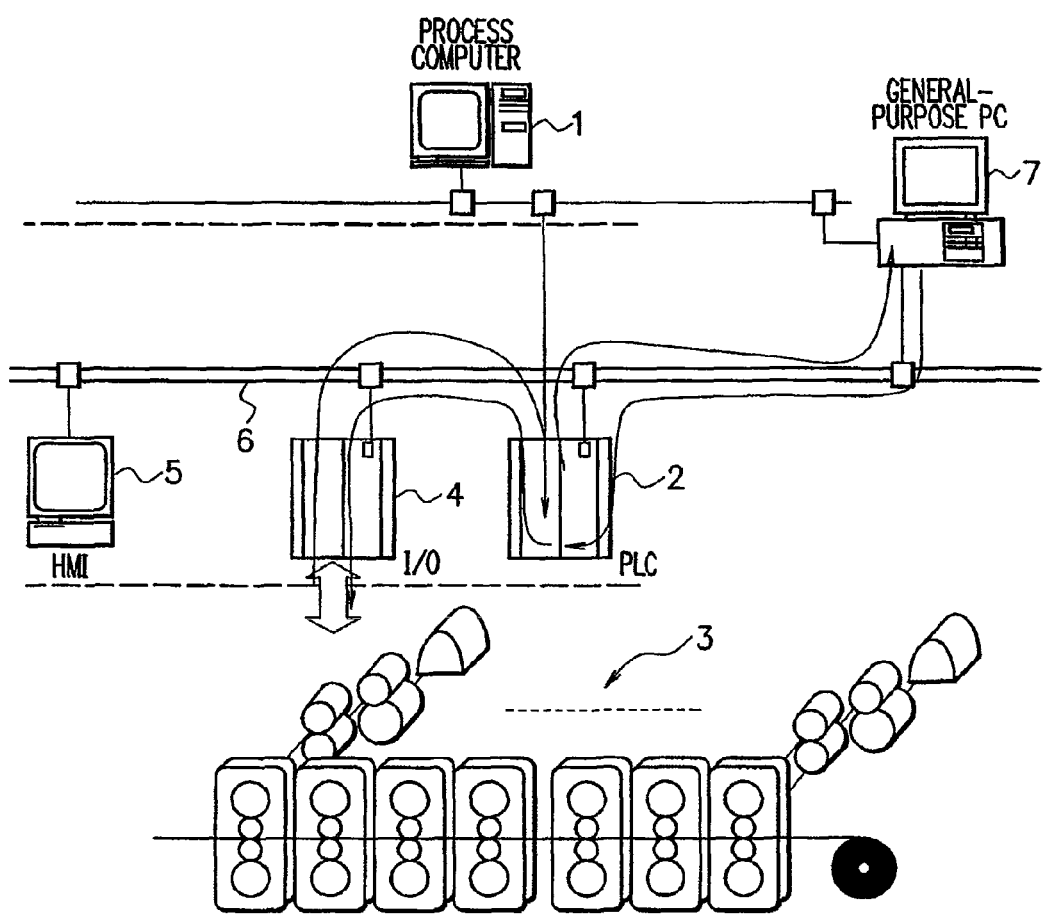

F I G. 3
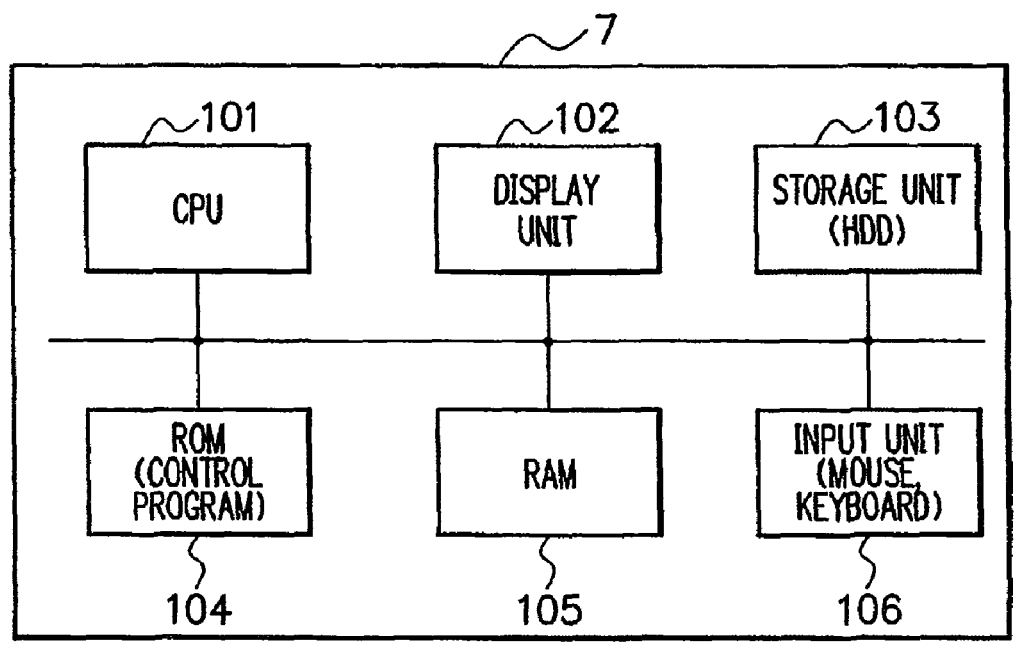

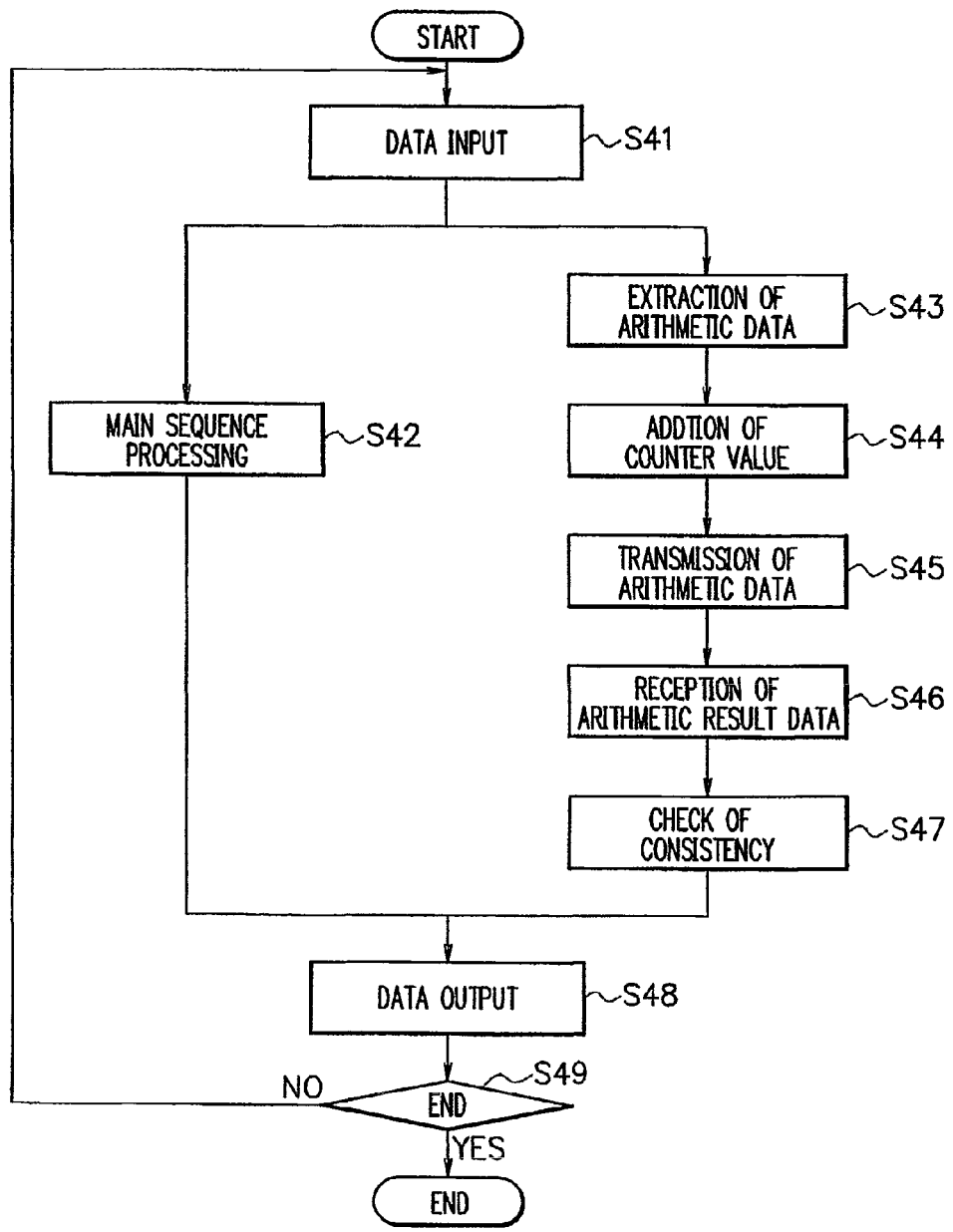

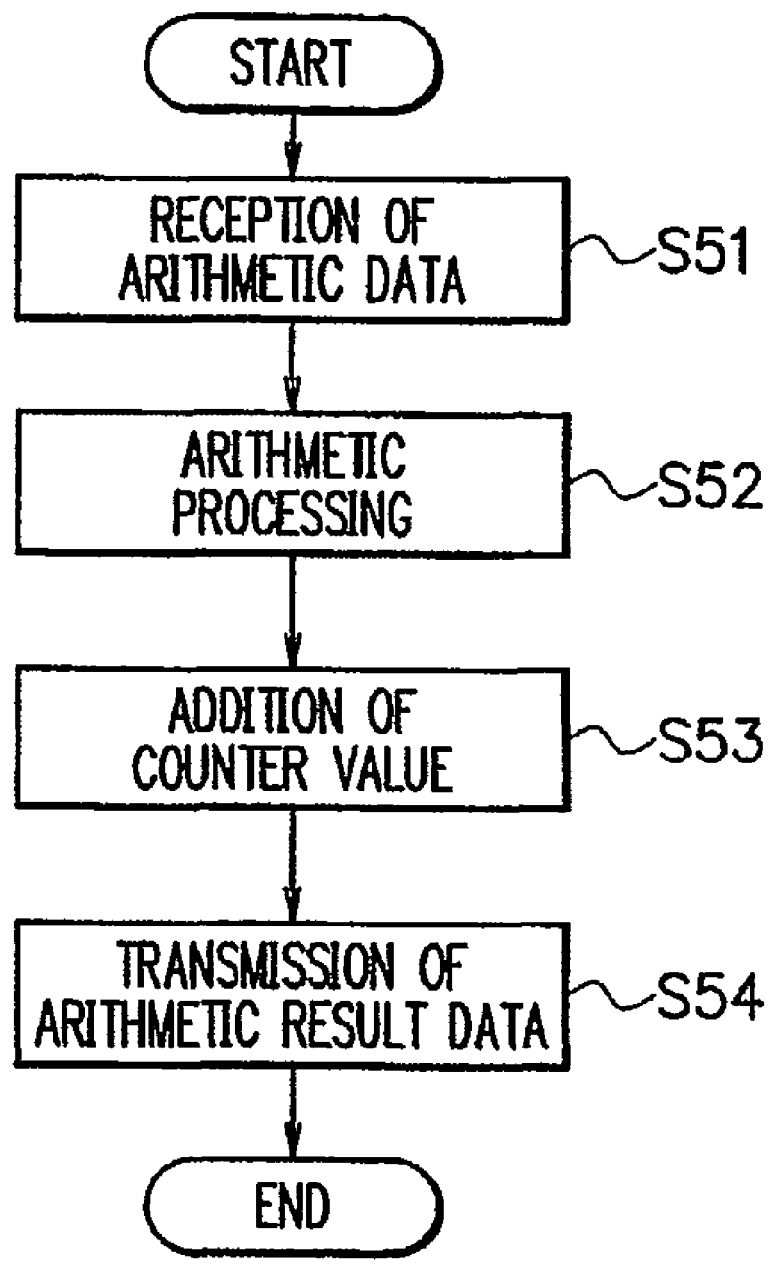

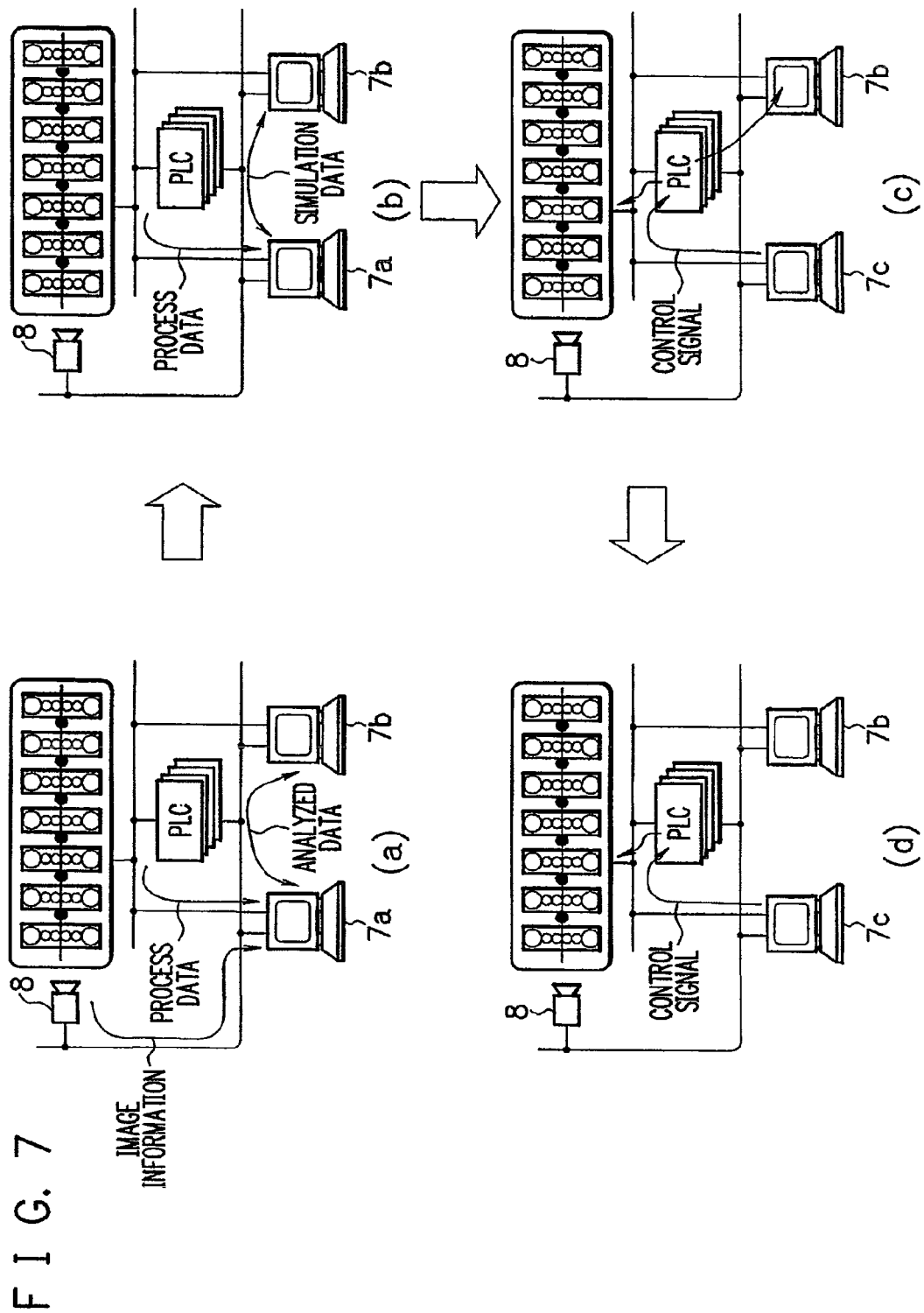

PLANT CONTROL SYSTEM AND METHOD

TECHNICAL FIELD

The present invention relates to a plant control system and method suitable for controlling, for example, a steelmaking plant.

BACKGROUND ART

In a plant control system controlling, for example, a steelmaking plant, a LAN is often constructed with a process computer managing and controlling the steelmaking plant as an upper layer and a programmable logic controller interposed between the process computer and various kinds of equipment of the steelmaking plant and a DCS being an instrumentation controller as a lower layer. The programmable logic controller controls actuators of the manufacturing apparatus and acquires sensor information from sensors for performing process measurement of the temperature, pressure, speed and so on of manufacturing process according to the output from the process computer, so as to mainly take charge of real-time control at a high speed in a period of about several milliseconds to several hundreds of milliseconds.

Patent Document 1: Japanese Laid-open Patent Publication No. 2000-137662

Besides, the programmable logic controller has the reliability and stability secured for the operation but has a problem of a low development efficiency of software for complicated or large-scale arithmetic processing accompanied by convergent arithmetic and learning arithmetic. On the other hand, the arithmetic processing ability of the general-purpose personal computer and the ease of developing software are drastically improved due to the development of the recent computer technology. From the viewpoints, there are many advantages in that the general-purpose personal computer is introduced into the same layer on the plant control system as that of the programmable logic controller to take charge of the arithmetic processing.

However, the general-purpose personal computer is superior in the arithmetic processing ability and the ease of developing software, but is inferior in reliability of punctuality and so on in the industrial application. Therefore, the general-purpose personal computer is in danger of causing a trouble when it is just connected to the various kinds of equipment of the steelmaking plant and controls them.

Relating to this kind of technology, Patent Document 1 discloses that the programmable logic controller is not directly connected to the host computer but is connected to the host computer via a display device having an arithmetic processing ability and a data communication suitability higher than those of the programmable logic controller. In Patent Document 1, the display device performs protocol conversion so that programmable logic controllers can be controlled by a common program on the host computer side.

SUMMARY OF THE INVENTION

An object of the present invention is to introduce a high-speed or highly-functional information processor such as a general-purpose personal computer or the like into a plant control system so that functions to be processed are divided between the programmable logic controller and the information processor to suit their data processing abilities, and to compensate the reliability of the information processor in the industrial application, for example, in the operation timing between the apparatuses and equipment constituting a manufacturing plant, that is, in punctuality.

To attain the above objects, a plant control system of the present invention includes: a process computer managing a plant; a programmable logic controller interposed between the process computer and equipment of the plant; and an information processor executing arithmetic processing based on arithmetic data received from the programmable logic controller and transmitting arithmetic result data thereof to the programmable logic controller, wherein the programmable logic controller includes a transmission processing unit extracting the arithmetic data from data inputted from the equipment of the plant into the programmable logic controller and transmitting the arithmetic data to the information processor; and a consistency check unit checking consistency with a predetermined reference for evaluating validity of the arithmetic result data received from the information processor.

The plant control method of the present invention is a plant control method by a plant control system, the plant control system including: a process computer managing a plant; a programmable logic controller interposed between the process computer and equipment of the plant; and an information processor executing arithmetic processing based on arithmetic data received from the programmable logic controller and transmitting arithmetic result data thereof to the programmable logic controller, wherein the programmable logic controller executes a transmission processing procedure of extracting the arithmetic data from data inputted from the equipment of the plant into the programmable logic controller and transmitting the arithmetic data to the information processor; and a consistency check procedure of checking consistency with a predetermined reference for evaluating validity of the arithmetic result data received from the information processor.

According to the present invention, the functions can be divided such that sequential control logic is executed by the programmable logic controller and complicated arithmetic processing is executed by the information processor such as the general-purpose personal computer or the like. This makes it possible to increase the accuracy and the speed of the plant control and to separate the development environments of software so as to improve the development efficiencies of software.

In addition, the arithmetic result data outputted from the information processor always passes through the programmable logic controller so that the consistency of the arithmetic result data is checked in the programmable logic controller. Therefore, the reliability of the information processor in the industrial application can be compensated, for example, in terms of punctuality.

BRIEF DESCRIPTION OF THE DRAWINGS

FIG. 1 is a view showing a schematic structure of a plant control system according to this embodiment;

FIG. 3 is a block diagram showing a hardware configuration example of the general-purpose PC according to this embodiment;

FIG. 4 is a flowchart showing the processing operation in the PLC according to this embodiment;

FIG. 5 is a flowchart showing the processing operation in the general-purpose PC according to this embodiment;

FIG. 7 is a view explaining a usage example of the plant control system to which the present invention is applied.

DETAILED DESCRIPTION OF THE PREFERRED EMBODIMENTS

Figure 2:
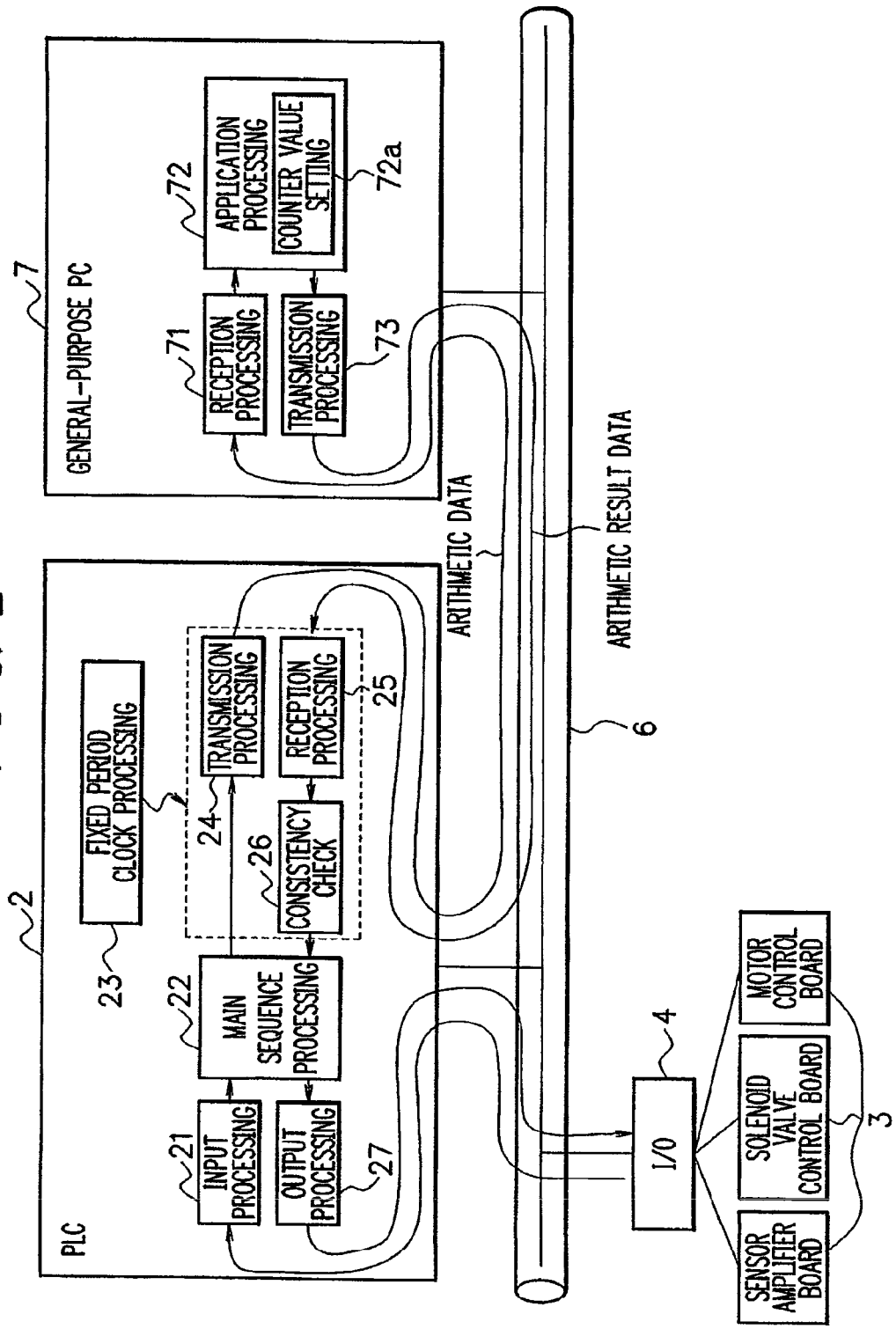
FIG. 2 is a block diagram showing functional configurations of a PLC and a general purpose PC according to this embodiment.

Hereinafter, a preferred embodiment of the present invention will be described with reference to the accompanying drawings.

FIG. 1 shows a schematic structure of a plant control system according to this embodiment. In this embodiment, a steelmaking plant including iron and steel manufacturing facilities (a rolling plant including spindle, gear, shaft, motor and so on for driving a rolling mill roll for rolling a steel plate in the illustrated example) will be described as an example.

As shown in FIG. 1, a process computer 1 on an upper layer and a programmable logic controller (PLC) 2 on a lower layer constitute a LAN under Ethernet (registered trademark) standards in the plant control system.

The process computer 1 on the upper layer, which manages the steelmaking plant, for example, issues a manufacturing instruction to an operator based on a manufacturing plan, collects various kinds of sensor information, and transmits information necessary for control to the PLC 2.

The PLC 2 on the lower layer, which is interposed between the process computer 1 and various kinds of equipment 3 (actuators, sensors and so on) of the steelmaking plant, controls the actuators according to the output from the process computer 1, acquires sensor information from the sensors, and so on. The PLC 2 on the lower layer mainly takes charge of real-time control at a high speed in a period of about several milliseconds to several hundreds of milliseconds.

An input/output module (I/O) 4 such as an RIO or the like into/from which data is inputted/outputted when the PLC 2 communicates with the equipment 3 of the steelmaking plant, a human-machine interface (HMI) 5 displaying various kinds of information such as the state and a work instruction relating to the steelmaking plant are included in the lower layer to constitute a LAN 6. Note that depending on the PLC 2, it may be directly connected to the equipment 3 of the steelmaking plant without passing through the input/output module (I/O) 4.

Further, a general-purpose personal computer (general-purpose PC) 7 is connected to the PLC 2 via the LAN 6. The general-purpose PC 7 is a computer installed separately from the process computer 1 on the upper layer. The general-purpose PC 7, which mainly executes arithmetic processing necessary for real-time control based on arithmetic data received from the PLC 2 and transmits the arithmetic result data to the PLC 2, corresponds to the information processor in the present invention. In FIG. 1, the general-purpose PC 7 is also connected to the process computer 1, but the general-purpose PC 7 only needs to be connected at least to the PLC 2 in the present invention.

Note that though only one PLC 2 is shown in FIG. 1, a plurality of PLCs 2 can be of course connected to the process computer.

In addition, the general-purpose PC 7 may be installed for each PLC 2, or may be shared among a plurality of PLCs 2. In the case where the general-purpose PC 7 is shared among the plural PLCs 2, for example, the general-purpose PC 7 may be configured to be able to perform integration arithmetic using arithmetic data received from one of the PLCs 2 and arithmetic data received from another of the PLCs 2 and transmit the arithmetic result data to both of the PLCs 2.

The PLC 2 here is a kind of a small-sized computer but is different from a standard computer in the way of operation, and uses, as the operation model, a state machine on the basis of a relay circuit as a prototype. The PLC 2 is not different from the standard computer in that it operates with software, but does not easily implement complicated arithmetic because it is programmed in a ladder language in many cases. However, the reliability and stability are ensured for the PLC 2 because it has been developed and used essentially for the industrial application for a long time.

On the other hand, the general-purpose PC 7 uses the general-purpose operating system (OS) such as Windows (registered trademark) or the like and is superior in arithmetic processing ability and ease of developing software. However, the general-purpose PC 7 is often inferior to the PLC in reliability in terms of punctuality (ensuring that information is transmitted within a predetermined control period) and so on in the industrial application. For example, depending on a comprexity, the arithmetic processing time may vary. Further, the general-purpose PC 7 is not necessarily to be made for a continuous operation for a long time, and therefore may cause a failure such as hang-up and so on in 24-hour operation or the like.

In the plant control system to which the present invention is applied, functions to be processed are divided such that a sequential control logic (various kinds of judgment or the like) is executed by the PLC 2 and complicated arithmetic processing (numerical arithmetic such as convergence arithmetic or the like) is executed by the general-purpose PC 7. In addition, the arithmetic result data outputted from the general-purpose PC 7 always passes through the PLC 2 so that the consistency of the arithmetic result data is checked in the PLC 2 to compensate the reliability of the general-purpose PC 7 in the industrial application, for example, in terms of punctuality.

Hereinafter, functional configurations of the PLC 2 and the general-purpose PC 7 will be described with reference to FIG. 2. In the PLC 2, 21 denotes an input processing unit into which data is inputted from the equipment 3 of the steelmaking plant via the I/O 4. 22 denotes a main sequence processing unit which executes sequential control logic.

23 denotes a fixed period clock processing unit which counts up in a fixed period T (for example, every 30 ms). 24 denotes a transmission processing unit which extracts predetermined arithmetic data from the data inputted into the PLC 2, typically, the data inputted from the equipment 3 of the steelmaking plant, and transmits it to the general-purpose PC 7. The transmission processing unit 24 adds a counter value which is made by adding +1 every transmission of the arithmetic data, as the time management information in the present invention when transmitting the arithmetic data to the general-purpose PC 7.

25 denotes a reception processing unit which receives the arithmetic result data from the general-purpose PC 7. 26 denotes a consistency check unit which checks the consistency with a predetermined reference for evaluating the validity of the arithmetic result data received from the general-purpose PC 7 though it will be described later in detail. 27 denotes an output processing unit which outputs data (for example, the data processed by the main sequence processing unit 22 and the arithmetic result data received by the reception processing unit 25 or data created by a simple arithmetic such as addition, subtraction, multiplication and division from the above-described data) to the equipment 3 of the steelmaking plant via the I/O 4.

In the general-purpose PC 7, 71 denotes a reception processing unit which receives the arithmetic data from the PLC 2. 72 denotes an application processing unit which executes arithmetic processing based on the arithmetic data received from the PLC 2. The application processing unit 72 has a counter value setting unit 72a to just set and add the counter value, which has been added to the arithmetic data that is the base of the arithmetic result data, to the arithmetic result data to be transmitted to the PLC 2. 73 denotes a transmission processing unit which transmits the arithmetic result data to the PLC 2.

FIG. 3 shows a hardware configuration example of the general-purpose PC 7. The general-purpose PC 7 is composed of a CPU 101 being a central processing unit controlling the whole apparatus, a display unit 102 displaying various input conditions, analysis results and so on, a storage unit 103 such as a hard disk or the like saving the analysis result and so on, a ROM (read only memory) 104 storing a control program, various application programs, data and so on, a RAM (random access memory) 105 being a working area used when the CPU 101 executes processing, and an input unit 106 such as a keyboard, a mouse and so on.

FIG. 4 is a flowchart showing the processing operation in the PLC 2. The PLC 2 executes the operations such as collection of data in the fixed period T and so on. Data is inputted into the input processing unit 21 from the equipment 3 of the steelmaking plant via the I/O 4 (Step S41), and the main sequence processing unit 22 executes the sequential control logic (Step S42).

In parallel with the main sequence processing at Step S42, the transmission processing unit 24 extracts the predetermined arithmetic data from the data inputted from the equipment 3 of the steelmaking plant (Step S43). The transmission processing unit 24 then adds the counter value to the arithmetic data (Step S44), and transmits the arithmetic data to the general-purpose PC 7 (Step S45). It is assumed here that the transmission processing unit 24 adds, for example, a count value X (X is an integer number) to the arithmetic data and transmits the resulting data to the general-purpose PC 7.

Afterward, when the reception processing unit 25 receives the arithmetic result data from the general-purpose PC 7 (Step S46), the consistency check unit 26 checks the consistency with the predetermined reference for evaluating the validity of the arithmetic result data (Step S47).

The check for the consistency at Step S47 will be described here. As has been described, in the general-purpose PC 7, the same counter value as the counter value, which has been added to the arithmetic data that is the base of the arithmetic result data, is added to the arithmetic result data to be transmitted to the PLC 2. Accordingly, if the counter value added to the arithmetic result data received at Step S46 is X, the arithmetic result data corresponds to the arithmetic data which has been recently transmitted, so that the data can be judged to have constant periodic consistency (the fixed periodicity is maintained).

As a matter of course, it is unnecessary to set the transmission of the arithmetic data and the reception of the arithmetic result data in the same period, and the reception of the arithmetic result data even after lapse of several periods may be allowed depending on the kind of data, the contents of arithmetic and so on. More specifically, as long as the counter value added to the arithmetic result data received at Step S46 is X-n (n is a predetermined integer number), the arithmetic result data may be judged to have constant periodic consistency.

Further, the consistencies such as whether the arithmetic result data received at Step S46 lies between predetermined upper/lower limit values, and whether the arithmetic result data has the same polarity (positive or negative) envisioned in the PLC 2, are also checked.

When it is judged that there is no consistency as a result of the check for consistency at Step S47, for example, the arithmetic result data is not used but is discarded. Further, when the arithmetic result data corresponding to the arithmetic data is not returned in a long time, the operator may be notified of the fact because some abnormal condition could occur in the general-purpose PC 7.

At Step S48, the output unit 27 adds the arithmetic result data which has been judged to have the consistency by the consistency check unit 26 or the data created by a simple arithmetic such as addition, subtraction, multiplication and division from the arithmetic result data, if existing, to the data processed by the main sequence processing unit 22, and outputs the resulting data to the equipment 3 of the steelmaking plant via the I/O 4.

The above-described processing at Steps S41 to S48 is repeated in a fixed period T until an end instruction is issued (Step S49).

FIG. 5 is a flowchart showing the processing operation in the general-purpose PC 7. The general-purpose PC 7 operates by occurrence of an event asynchronously with the clock of the PLC 2. When the reception processing unit 71 receives the arithmetic data from the PLC 2 (Step S51), the application processing unit 72 executes the arithmetic processing (Step S52). Then, the counter value setting unit 72a just sets and adds the counter value, which has been added to the arithmetic data that is the base of the arithmetic result data, to the arithmetic result data to be transmitted to the PLC 2 (Step S53), and the transmission processing unit 73 transmits the arithmetic result data to the PLC 2 (Step S54).

Figure 6A:
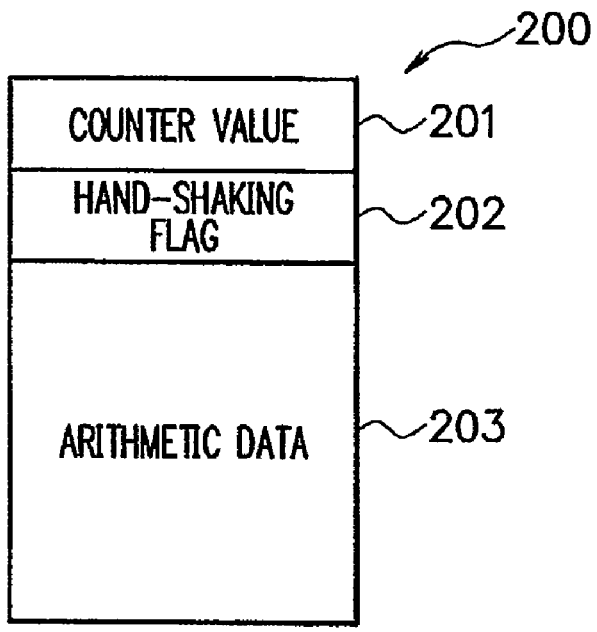
FIG. 6A is an illustration showing a configuration example of an arithmetic data file to be transmitted from the PLC to the general-purpose PC according to this embodiment.
Figure 6B:
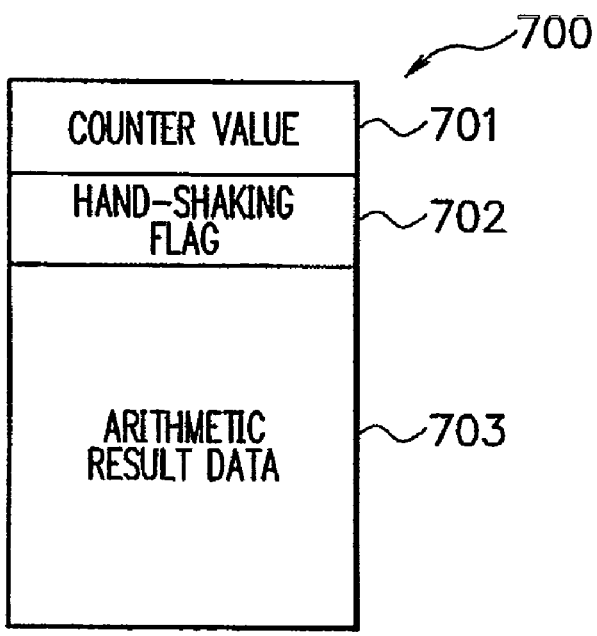
FIG. 6B is an illustration showing a configuration example of an arithmetic result data file to be transmitted from the general-purpose PC to the PLC according to this embodiment.

FIG. 6A shows a configuration example of an arithmetic data file 200 to be transmitted from the PLC 2 to the general-purpose PC 7, and FIG. 6B shows a configuration example of an arithmetic result data file 700 to be transmitted from the general-purpose PC 7 to the PLC 2. The arithmetic data file 200 and the arithmetic result data file 700 are composed including counter values 201 and 701, hand-shaking flags 202 and 702, and real data (arithmetic data 203 and arithmetic result data 703), respectively.

The hand-shaking flags 202 and 702 are for surely linking the sequence processing in the PLC 2 and the arithmetic processing in the general-purpose PC 7. By adding an unique number to the operation at the time of sequence when the general-purpose PC 7 needs to operate in conjunction, the unique number is transmitted together with the arithmetic data at the time when the arithmetic data is transmitted from the PLC 2 to the general-purpose PC 7 (that is, the timing of starting the operation of the general-purpose PC 7) to latch the sequence processing. Then, using the number transmitted together with the arithmetic result data at the time of completion of the operation of the general-purpose PC 7, the latch is released and the sequence processing is advanced.

As described above, the functions can be divided such that sequential control logic is executed by the PLC 2 and complicated arithmetic processing is executed by the general-purpose PC 7. This makes it possible to increase the accuracy and the speed of the plant control and to separate the development environments of software so as to improve the development efficiencies of software.

In addition, the arithmetic result data outputted from the general-purpose PC 7 always passes through the PLC 2 so that the consistency of the arithmetic result data is checked in the PLC 2. Therefore, the reliability of the general-purpose PC 7 in the industrial application can be compensated, for example, in terms of punctuality. This makes it possible to secure the punctuality of the general-purpose PC 7 (general-purpose OS) in which the punctuality of the arithmetic processing is secured, so as to apply the general-purpose PC 7 to the plant control.

FIG. 7 is a view explaining a usage example of the plant control system to which the present invention is applied. As shown in FIG. 7, the PLC 2 is connected to an analysis PC 7*a*, a simulation PC 7*b* and a control PC 7*c* which are general purpose PCs. Note that the three PCs 7*a* to 7*c* are illustrated as separate PCs for explaining the functions, but those may not be separate PCs. This example is an example of making, more efficient, development of the following steps: (1) task analysis, (2) development of a solution and off-line verification, (3) experimental manufacture, verification and evaluation, and (4) permanent use.

(1) Task Analysis

As shown in a state (a) of FIG. 7, the analysis PC 7*a* collects the process data from the steelmaking plant and synchronously replays image information from an industrial television (ITV) 8 monitoring the steelmaking plant to analyze the data in real time. Then, the data analyzed by the analysis PC 7*a* is inputted into the simulation PC 7*b* and subjected to data analysis at a higher level. Though the data is inputted into the general-purpose PC 7 from the steelmaking plant via the PLC 2 in the description of the above-described embodiment, the data may be directly inputted from the steelmaking plant for the purpose of collecting the process data. As a matter of course, process data selected by the PLC 2 may be inputted.

(2) Development of Solution and Off-Line Verification

If some measures are necessary as a result of analysis, development and verification of a measure consideration model are performed as shown in a state (b) of FIG. 7. Specifically, the process data collected by the analysis PC 7*a* is compared to the simulation data simulated by the simulation PC 7*b* so that the simulation PC 7*b* performs the model verification by the simulation and verification by estimation of unpredictabile data.

(3) Experimental Manufacture, Verification and Evaluation

Next, a verification logic using a general-purpose PC easily programmed is created as shown in a state (c) of FIG. 7. Then, the simulation PC 7*b* is used to perform a parallel-running verification and to perform an actual device test and verification in cooperation with the PLC 2.

(4) Permanent Use

Next, as shown in a state (d) of FIG. 7, the logic for which the validity has been verified is applied to an actual apparatus via the PLC 2 (sharing is made such that I/L and the upper/lower limit check are performed by the PLC 2 and complicated model arithmetic is performed by the PC).

The present invention has been described with the embodiment hereinabove. The present invention is not limited only to that embodiment, but may be modified within the scope of the present invention. For example, though the counter value, which has been added to the arithmetic data that is the base of the arithmetic result data to be transmitted to the PLC 2 (namely, the same counter value), is just set and added to the arithmetic result data to be transmitted to the PLC 2, in the general-purpose PC 7 in the above-described embodiment, the counter values do not need be the same as long as time management information associated with the time management information which has been added to the arithmetic data that is the base can be added.

INDUSTRIAL APPLICABILITY

Though the steelmaking plant including the iron and steel manufacturing facilities has been described as an example in the above embodiment, the present invention is applicable to the case of controlling various kinds of plants for gas, food and medicine, chemical product, automobile, semiconductor and so on.

What is claimed is:

1. A plant control system comprising:
a process computer managing a plant;
a programmable logic controller interposed between said process computer and equipment of the plant; and
an information processor executing arithmetic processing based on arithmetic data received from said programmable logic controller and transmitting arithmetic result data thereof to said programmable logic controller,
wherein said programmable logic controller comprises a transmission processing unit extracting the arithmetic data from data inputted from the equipment of the plant into said programmable logic controller and transmitting the arithmetic data to said information processor; and a consistency check unit checking consistency with a predetermined reference for evaluating validity of the arithmetic result data received from said information processor.

2. The plant control system according to claim 1,
wherein said programmable logic controller comprises a unit adding time management information when transmitting the arithmetic data to said information processor,
wherein said information processor comprises a unit adding time management information associated with the time management information, which has been added to the arithmetic data being a base of the arithmetic result data, to the arithmetic result data to be transmitted to said programmable logic controller, and
wherein said consistency check unit checks constant periodic consistency based on the time management information added to the arithmetic result data received from said information processor.

3. The plant control system according to claim 1,
wherein said consistency check unit checks consistency of at least any one of upper/lower limits and a polarity of the arithmetic result data received from said information processor.

4. The plant control system according to claim 2,
wherein said consistency check unit checks consistency of at least any one of upper/lower limits and a polarity of the arithmetic result data received from said information processor.

5. A plant control method by a plant control system, the plant control system comprising:

a process computer managing a plant;

a programmable logic controller interposed between the process computer and equipment of the plant; and an information processor executing arithmetic processing based on arithmetic data received from the programmable logic controller and transmitting arithmetic result data thereof to the programmable logic controller, wherein the programmable logic controller executes a transmission processing procedure of extracting the arithmetic data from data inputted from the equipment of the plant into the programmable logic controller and transmitting the arithmetic data to the information processor; and a consistency check procedure of checking consistency with a predetermined reference for evaluating validity of the arithmetic result data received from the information processor.

* * * * *